US010837355B2

(12) United States Patent
Endo et al.

(10) Patent No.: US 10,837,355 B2
(45) Date of Patent: Nov. 17, 2020

(54) INTERNAL COMBUSTION ENGINE

(71) Applicant: HONDA MOTOR CO., LTD., Minato-Ku, Tokyo (JP)

(72) Inventors: Hiromitsu Endo, Wako (JP); Masafumi Taki, Wako (JP); Yoshiteru Oikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/219,311

(22) Filed: Dec. 13, 2018

(65) Prior Publication Data
US 2019/0203636 A1  Jul. 4, 2019

(30) Foreign Application Priority Data

Dec. 28, 2017  (JP) ................................ 2017-254586
Dec. 28, 2017  (JP) ................................ 2017-254587

(51) Int. Cl.
*F02B 61/02* (2006.01)
*F02B 25/04* (2006.01)
(Continued)

(52) U.S. Cl.
CPC ............ F02B 61/02 (2013.01); F02B 17/005 (2013.01); F02B 19/12 (2013.01); F02B 19/16 (2013.01);
(Continued)

(58) Field of Classification Search
CPC ........ F02B 61/02; F02B 17/005; F02B 19/12; F02B 19/16; F02B 23/101; F02B 75/041;
(Continued)

(56) References Cited

U.S. PATENT DOCUMENTS 4,303,045 A * 12/1981 Austin, Jr. .............. F02B 19/14
                                                        123/193.4
4,930,473 A    6/1990 Dietrich
(Continued)

FOREIGN PATENT DOCUMENTS

JP     36-013602 Y    5/1961
JP     S55-142931 U  10/1980
(Continued)

OTHER PUBLICATIONS

Extended European search report dated Apr. 5, 2019 issued in the corresponding EP Patent Application No. 18213281.1.
(Continued)

*Primary Examiner* — Grant Moubry
(74) *Attorney, Agent, or Firm* — Carrier Blackman & Associates, P.C.; William D. Blackman; Joseph P. Carrier

(57) ABSTRACT

An internal combustion engine includes an auxiliary chamber bulkhead, the auxiliary chamber bulkhead including: a peripheral wall portion that is inserted in a vertical hole extending from a combustion chamber along a reference axis and that is in contact with an inner wall of the vertical hole about the reference axis; and a bottom wall portion that is continuous from the peripheral wall portion and that bulges from the vertical hole toward the combustion chamber, the peripheral wall portion and the bottom wall portion defining an auxiliary chamber that communicates with the combustion chamber. An ignition plug is disposed above the peripheral wall portion along the reference axis. A fuel injection valve is disposed in a position inclined with respect to the reference axis toward an opening formed in an inner surface of the peripheral wall portion.

18 Claims, 6 Drawing Sheets

(51) Int. Cl.
- *F02B 23/10* (2006.01)
- *F02M 35/16* (2006.01)
- *F02M 35/10* (2006.01)
- *F02F 1/24* (2006.01)
- *F02F 1/42* (2006.01)
- *F02B 19/12* (2006.01)
- *F02B 19/16* (2006.01)
- *F02B 17/00* (2006.01)
- *F02B 75/04* (2006.01)
- *H01T 13/54* (2006.01)
- *F02B 75/12* (2006.01)

(52) U.S. Cl.
CPC .......... *F02B 23/101* (2013.01); *F02B 75/041* (2013.01); *F02F 1/242* (2013.01); *F02F 1/4285* (2013.01); *F02M 35/10216* (2013.01); *F02M 35/162* (2013.01); *F02B 2075/125* (2013.01); *H01T 13/54* (2013.01)

(58) Field of Classification Search
CPC ... F02B 2075/125; F02F 1/242; F02F 1/4285; F02M 35/162; F02M 35/10216
See application file for complete search history.

(56) References Cited

U.S. PATENT DOCUMENTS

| | | | |
|---|---|---|---|
| 5,024,193 A | 6/1991 | Graze, Jr. | |
| 8,006,666 B2 | 8/2011 | Ashida et al. | |
| 9,528,434 B1 | 12/2016 | Thomassin et al. | |
| 9,771,919 B2 * | 9/2017 | Kim | F02P 9/002 |
| 9,816,430 B2 * | 11/2017 | Yuuki | F02B 19/08 |
| 2012/0242215 A1 | 9/2012 | Hwang et al. | |
| 2014/0026846 A1 * | 1/2014 | Johnson | F02B 19/1009 123/260 |
| 2016/0053668 A1 | 2/2016 | Loetz et al. | |
| 2017/0122184 A1 * | 5/2017 | Hampson | F02D 41/0027 |
| 2017/0138251 A1 * | 5/2017 | Watanabe | F02B 19/18 |
| 2018/0010536 A1 * | 1/2018 | Blaxill | F02B 19/1085 |
| 2018/0313260 A1 * | 11/2018 | Nonaka | F02D 19/02 |
| 2018/0363539 A1 * | 12/2018 | Shelby | F02B 19/108 |
| 2018/0372055 A1 * | 12/2018 | Hirayama | F02D 37/02 |
| 2019/0040807 A1 * | 2/2019 | Kizuka | F02D 41/126 |

FOREIGN PATENT DOCUMENTS

| | | |
|---|---|---|
| JP | S55-142931 A | 11/1980 |
| JP | 04-065923 U | 6/1992 |
| JP | H05-504185 A | 7/1993 |
| JP | H06-33768 A | 2/1994 |
| JP | H06-33769 A | 2/1994 |
| JP | H06-241050 A | 8/1994 |
| JP | H08-35427 A | 2/1996 |
| JP | 2003-193908 A | 7/2003 |
| JP | 2007-255370 A | 10/2007 |
| JP | 2008-050978 A | 3/2008 |
| JP | 2008-169706 A | 7/2008 |
| JP | 2008-280957 A | 11/2008 |
| JP | 2009-236017 A | 10/2009 |
| JP | 2012-199236 A | 10/2012 |
| JP | 2013-133717 A | 7/2013 |
| WO | 2017/082953 A1 | 5/2017 |

OTHER PUBLICATIONS

Official Communication issued over the corresponding Japanese Patent Application No. 2017-254586 dated May 29, 2019.
English translation of Official Communication issued over corresponding Japanese Patent Application No. 2017-254587 dated May 22, 2019.

* cited by examiner

INTERNAL COMBUSTION ENGINE

BACKGROUND OF THE INVENTION

Field of the Invention

The present invention relates to an internal combustion engine comprising an auxiliary chamber bulkhead, the auxiliary chamber bulkhead including a peripheral wall portion that is inserted in a vertical hole extending from a combustion chamber along a reference axis and that is in contact with an inner wall of the vertical hole about the reference axis, and a bottom wall portion that is continuous from the peripheral wall portion and that bulges from the vertical hole toward the combustion chamber, the peripheral wall portion and the bottom wall portion defining an auxiliary chamber that communicates with the combustion chamber.

Description of the Related Art

Japanese Patent Application Laid-open No. 2008-169706, for example, discloses an indirect injection engine (internal combustion engine). In the indirect injection engine, a tip end of an ignition plug and a passage communicating with a fuel injection valve are disposed in a ceiling surface of an auxiliary chamber. When fuel is injected, the ignition plug ignites a mixture in the auxiliary chamber. A flame jet generated by combustion spurts out radially into a combustion chamber from orifices formed in a bottom wall portion of an auxiliary chamber bulkhead. High-efficiency and low-NOx combustion can be achieved because the flame jet steadily burns a lean mixture in the combustion chamber.

In the configuration disclosed in Japanese Patent Application Laid-open No. 2008-169706, because of the ignition plug and the fuel injection valve disposed in juxtaposition with each other, the auxiliary chamber has a wide width (diameter), which requires that a wide gap be provided between an intake valve and an exhaust valve. Thus, the configuration has been hard to be applied to a cylinder having a small-diameter bore.

Japanese Patent Application Laid-open No. 2013-133717 discloses an indirect injection engine that includes an auxiliary chamber communicating with a combustion chamber and disposed in front of an ignition plug. A cylinder head has an insertion hole formed therein. The insertion hole receives an auxiliary chamber bulkhead that forms the auxiliary chamber. The insertion hole includes a small-diameter portion and a large-diameter portion. The small-diameter portion is disposed on the combustion chamber side. The large-diameter portion has a diameter greater than a diameter of the small-diameter portion and is connected with the small-diameter portion via a shoulder. The auxiliary chamber bulkhead includes a small-diameter tubular portion and a large-diameter tubular portion. The small-diameter tubular portion is inserted in the small-diameter portion of the insertion hole. The large-diameter tubular portion is connected with the small-diameter tubular portion and inserted in the large-diameter portion of the insertion hole.

A gasket is mounted at a front end of the large-diameter tubular portion around the small-diameter tubular portion. The gasket is clamped between the cylinder head and the auxiliary chamber bulkhead by functioning of an axial pressing force acting from an ignition plug holder on the large-diameter tubular portion. When the gasket is clamped in position, the pressing force from the ignition plug holder acts axially on the large-diameter tubular portion of the auxiliary chamber bulkhead. Thus, the large-diameter tubular portion of the auxiliary chamber bulkhead is required to have a sufficient wall thickness. Reduction in the wall thickness of the peripheral wall portion in an attempt to reduce the size of the auxiliary chamber bulkhead can lead to insufficient sealing performance.

SUMMARY OF THE INVENTION

An object of the present invention is to provide an internal combustion engine that achieves an auxiliary chamber capable of being readily applied to a cylinder having a small-diameter bore, while contributing to reduction in size of the auxiliary chamber.

The object of the present invention is also to provide an internal combustion engine that can ensure reliably sealing performance and contribute to reduction in size of an auxiliary chamber bulkhead.

In order to achieve the object, according to a first aspect of the present invention, there is provided an internal combustion engine comprising an auxiliary chamber bulkhead, the auxiliary chamber bulkhead including a peripheral wall portion that is inserted in a vertical hole extending from a combustion chamber along a reference axis and that is in contact with an inner wall of the vertical hole about the reference axis, and a bottom wall portion that is continuous from the peripheral wall portion and that bulges from the vertical hole toward the combustion chamber, the peripheral wall portion and the bottom wall portion defining an auxiliary chamber that communicates with the combustion chamber, wherein the engine further comprises: an ignition plug disposed above the peripheral wall portion along the reference axis; and a fuel injection valve disposed in a position inclined with respect to the reference axis toward an opening formed in an inner surface of the peripheral wall portion.

According to the first aspect of the present invention, whereas the ignition plug is disposed above the peripheral wall portion, the fuel injection valve is disposed in an area around the peripheral wall portion. Thus, compared with a configuration in which the ignition plug and the fuel injection valve are disposed in juxtaposition with each other, the auxiliary chamber can have a reduced width (diameter). This feature eliminates the need for a wide gap between an intake valve and an exhaust valve disposed around the ignition plug and the fuel injection valve, so that the auxiliary chamber can be readily applied to a cylinder having a small-diameter bore.

According to a second aspect of the present invention, in addition to the first aspect, there is provided the internal combustion engine, further comprising: a fuel injection passage that extends from an injection port of the fuel injection valve to the opening and that has a diameter smaller than a diameter of the fuel injection valve.

According to the second aspect of the present invention, because the fuel injection passage is formed to have a narrow diameter, the fuel injection valve can be protected from combustion pressure in the auxiliary chamber. Durability of the fuel injection valve is thus improved.

According to a third aspect of the present invention, in addition to the second aspect, the bottom wall portion bulges in a dome shape toward the combustion chamber.

According to the third aspect of the present invention, the bottom wall portion has an increasing wall thickness toward the center. Thus, a sufficient wall thickness is given to the bottom wall portion. The bottom wall portion, after having been cooled by fuel injected from the fuel injection valve, is subjected to high temperatures to correspond to combustion inside the combustion chamber. Because of the sufficient wall thickness given to the bottom wall portion, thermal energy tends to stagnate at the bottom wall portion, compared with a configuration in which the bottom wall portion is formed into a thin-sheet shape. As a result, the bottom wall portion can be maintained at an optimum temperature regardless of the fuel cooling or combustion. Deposits, for example, are prevented from increasing to correspond to the maintained temperature and durability of the auxiliary chamber bulkhead is improved.

According to a fourth aspect of the present invention, in addition to the third aspect, the peripheral wall portion has a wall having a thickness increasing toward the bottom wall portion.

According to the fourth aspect of the present invention, because the peripheral wall portion is connected with the bottom wall portion via a region having a maximum wall thickness, heat transfer from the bottom wall portion toward the peripheral wall portion is promoted. Consequently, heat of the bottom wall portion can be efficiently diffused from the inner wall surface of the vertical hole toward the member that defines the vertical hole.

According to a fifth aspect of the present invention, in addition to the fourth aspect, the peripheral wall portion has a communication hole formed therein at a lower end thereof, at which the peripheral wall portion is connected with the bottom wall portion, the communication hole passing through the peripheral wall portion in a wall thickness direction and connecting the auxiliary chamber with the combustion chamber.

According to the fifth aspect of the present invention, because the communication hole passes through the peripheral wall portion at the lower end of the peripheral wall portion in the thickness direction, the communication hole is allowed to have a sufficient length by utilizing the increase in the wall thickness. As a result, combustion gas can be injected in an optimum injection direction from the space inside the auxiliary chamber toward the combustion chamber.

According to a sixth aspect of the present invention, in addition to the first aspect, there is provided the internal combustion engine, further comprising: a cylinder head defining therein an insertion hole, the insertion hole including the vertical hole and a plug hole having a diameter greater than a diameter of the vertical hole and connected with the vertical hole via a shoulder, the insertion hole opening to a wall surface of the combustion chamber; a flange formed in the auxiliary chamber bulkhead and inserted into the plug hole to thereby overlap on the shoulder; a first sealing member overlapping on the flange; and an ignition plug holder inserted into the plug hole to have a tip end pressing the first sealing member against the flange, to thereby hold the ignition plug in place and position a tip end of the ignition plug with respect to the auxiliary chamber.

According to the sixth aspect of the present invention, pressure leakage of the auxiliary chamber can be reliably prevented, because the first sealing member is axially clamped between the ignition plug holder and the flange of the auxiliary chamber bulkhead through the functioning of an axial pressing force acting from the ignition plug holder. Moreover, the flange pressed against the shoulder functions as a sealing member. Thus, even when the peripheral wall in contact with the inner wall of the vertical hole is thin, escapes of pressure leaking from the combustion chamber along the inner wall of the vertical hole can be reliably prevented from occurring.

According to a seventh aspect of the present invention, in addition to the sixth aspect, there is provided the internal combustion engine, further comprising: a second sealing member clamped between the ignition plug holder and an inner wall of the plug hole.

According to the seventh aspect of the present invention, the second sealing member, because being disposed outside in the axial direction with respect to the flange of the auxiliary chamber bulkhead and the first sealing member, exhibits a sealing function commonly for gas leakage of the combustion chamber and gas leakage of the auxiliary chamber. Thus, reduction of the sealing member in the internal combustion engine can be achieved.

According to an eighth aspect of the present invention, in addition to the seventh aspect, the first sealing member is an axial metal seal and the second sealing member is a radial resin seal.

According to the eighth aspect of the present invention, the first sealing member as a metal seal can reliably prevent pressure leakage even with a configuration of being clamped between the flange of the auxiliary chamber bulkhead and the ignition plug holder to thereby be subjected to axial load. The second sealing member as a resin seal facilitates removal and installation for greater maintainability.

According to a ninth aspect of the present invention, in addition to the eighth aspect, the vertical hole and the auxiliary chamber bulkhead include respective constricted portions that contact each other and diminish in size in a radial direction in going closer to the combustion chamber.

According to the ninth aspect of the present invention, a labyrinth structure formed between the inner wall of the vertical hole and the outer surface of the auxiliary chamber bulkhead can prevent escapes of pressure leaking from the combustion chamber along the inner wall of the vertical hole. The foregoing reduces load on the second sealing member and simplifies the sealing structure.

According to a tenth aspect of the present invention, in addition to the ninth aspect, the ignition plug holder includes: a cylindrical portion that is formed into a cylinder shape coaxial with the ignition plug and that has a tip end clamping the first sealing member between the tip end and the flange of the auxiliary chamber bulkhead; and a threaded portion that is connected with an upper end of the cylindrical portion and formed into a cylinder shape coaxial with the ignition plug and that has a threaded groove formed in an outer periphery of the threaded portion, and the second sealing member is disposed on an outer periphery of the cylindrical portion.

According to the tenth aspect of the present invention, because the ignition plug holder is formed into a cylinder shape coaxial with the ignition plug, a difference in outline between the auxiliary chamber and the ignition plug holder can be reduced. This feature eliminates the need for a wide gap between the intake valve and the exhaust valve, so that the auxiliary chamber can be readily applied to a cylinder having a small-diameter bore.

According to a eleventh aspect of the present invention, in addition to the tenth aspect, the threaded groove of the ignition plug holder is disposed at a position overlapping a threaded groove of the ignition plug in an axial direction.

According to the eleventh aspect of the present invention, the ignition plug is coupled with the ignition plug holder through the threaded groove and favorable heat transfer is achieved from the ignition plug to the ignition plug holder over a range of the threaded groove. Similarly, the ignition plug holder is coupled with the cylinder head through the threaded groove and favorable heat transfer is achieved from the ignition plug holder to the cylinder head over a range of the threaded groove. Heat transfer is thereby promoted from the ignition plug to the cylinder head.

According to a twelfth aspect of the present invention, in addition to the eleventh aspect, the fuel injection valve is mounted in the cylinder head independently of the ignition plug holder.

According to the twelfth aspect of the present invention, whereas the ignition plug holder is disposed above the axial direction of the auxiliary chamber bulkhead, the fuel injection valve is disposed in an area around the auxiliary chamber bulkhead independently of the ignition plug holder. The ignition plug holder can have a reduced width (diameter). This feature eliminates the need for a wide gap between the intake valve and the exhaust valve disposed around the ignition plug and the fuel injection valve, so that the auxiliary chamber can be readily applied to a cylinder having a small-diameter bore.

According to a thirteenth aspect of the present invention, in addition to the twelfth aspect, the ignition plug holder is formed of a copper-based material.

According to the thirteenth aspect of the present invention, because the ignition plug holder is formed of a copper-based material, favorable heat transfer can be achieved and the ignition plug can be favorably prevented from being electrically charged to correspond to favorable conductivity of the copper-based material.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention will be described below with reference to the accompanying drawings. It is noted that expressions indicating directions of up and down, front and rear, and right and left are to be defined with reference to a line of sight of an occupant of a two-wheeled motor vehicle.

Figure 1:
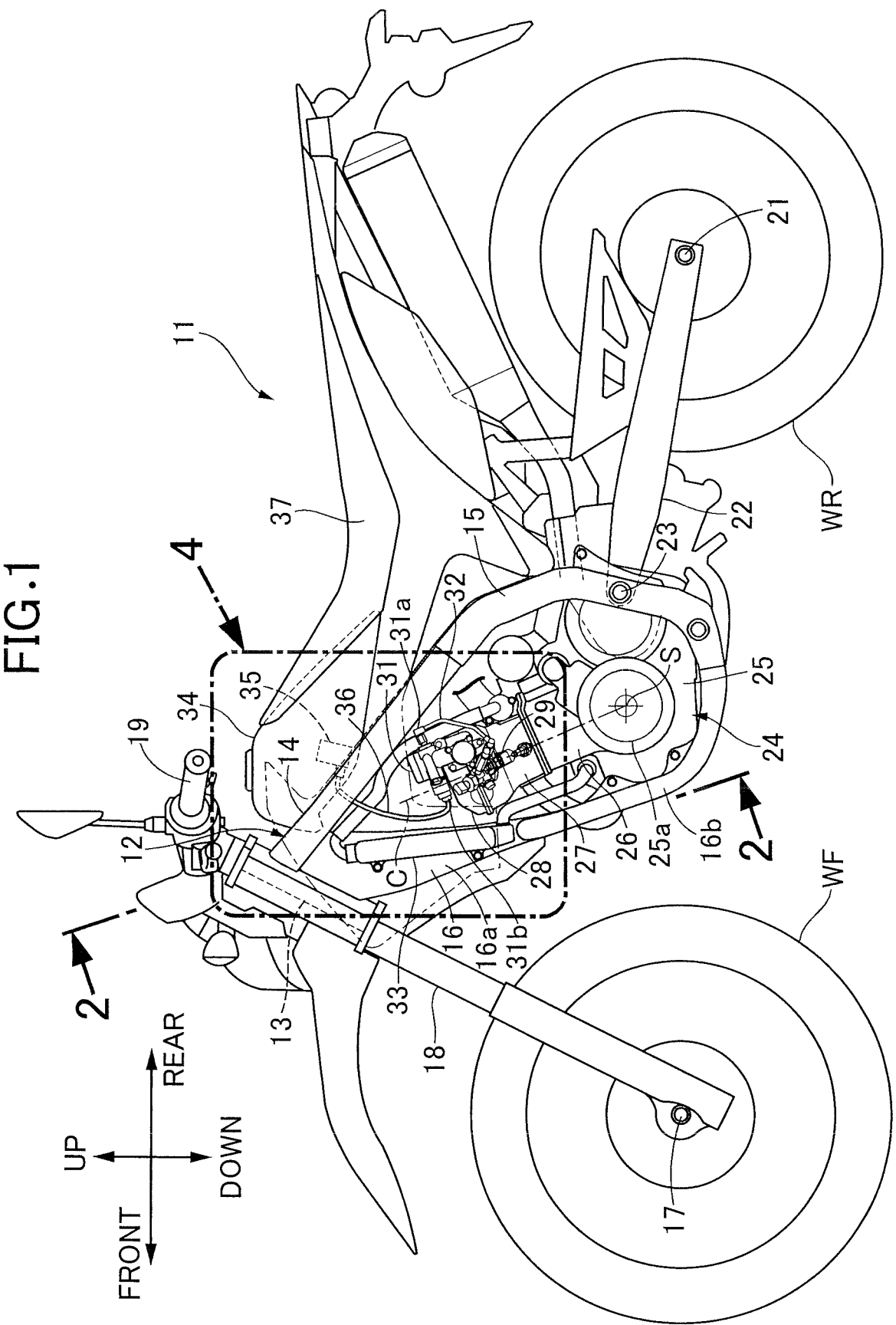
FIG. 1 is a side view schematically depicting a configuration of a two-wheeled motor vehicle according to an embodiment of the present invention.

FIG. 1 schematically depicts a general configuration of a two-wheeled motor vehicle (a specific example of a saddled vehicle) according to an embodiment of the present invention. A two-wheeled motor vehicle 11 includes a vehicle body frame 12. The vehicle body frame 12 includes a head pipe 13, a pair of left and right main frames 14, a pair of left and right pivot frames 15, and a down frame 16. The main frames 14 extend from the head pipe 13 downwardly toward the rear. The pivot frames 15 are coupled with rear ends of the respective main frames 14 and extend therefrom downwardly. The pivot frames 15 are connected with each other by a cross pipe (not depicted). The down frame 16 extends from the head pipe 13 downwardly through a space below the main frames 14. The down frame 16 includes one upper frame 16a and a pair of left and right lower pipe frames 16b. The upper frame 16a extends downwardly from the head pipe 13 at a lateral central position in a vehicle width direction. The lower pipe frames 16b branch laterally from a lower end of the upper frame 16a and are coupled with lower ends of the respective pivot frames 15. The upper frame 16a of the down frame 16 is farther downwardly away from the main frames 14 at greater distances toward the rear from the head pipe 13.

The head pipe 13 steerably supports a front fork 18. The front fork 18 supports a front wheel WF rotatably about an axle 17. A handlebar 19 is coupled with the front fork 18 at a position above the head pipe 13. The pivot frames 15 support a swing arm 22 swingably about a pivot shaft 23. The swing arm 22 supports a rear wheel WR rotatably about an axle 21. The pivot shaft 23 extends horizontally in the vehicle width direction.

An internal combustion engine 24 is mounted on the vehicle body frame 12 between the front wheel WF and the rear wheel WR. The internal combustion engine 24 includes a crankcase 25, a cylinder block 26, a cylinder head 27, and a head cover 28. The crankcase 25 is disposed in a space between the left and right pivot frames 15 and sandwiched between the left and right lower pipe frames 16b, and is coupled with the pivot frames 15 and the lower pipe frames 16b. The cylinder block 26 is coupled with the crankcase 25, extends upwardly from the crankcase 25, and has a cylinder axis C that is inclined toward the front. The cylinder head 27 is coupled with the cylinder block 26. The head cover 28 is coupled with the cylinder head 27. The crankcase 25 supports a crankshaft that rotates about a rotational axis S extending in parallel with the axle 21 of the rear wheel WR. Rotary motion of the crankshaft is transmitted to the rear wheel WR by way of a transmission (not depicted). The crankshaft has one end coupled with a direct current generator (AGC) or other auxiliary and covered in a case cover 25a. It is noted that the internal combustion engine 24 is configured, for example, as a single-cylinder internal combustion engine. The cylinder block 26, the cylinder head 27, and the head cover 28 are disposed between the main frames 14 and the down frame 16 as seen in a side view that is projected in parallel with the rotational axis S of the crankshaft onto a projection plane orthogonal to the rotational axis S of the crankshaft. Detailed descriptions of structures found commonly in ordinary internal combustion engines may be omitted in the following.

A fuel injection valve 29 and a fuel pump 31 are mounted on one side surface of the cylinder head 27. The fuel injection valve 29 is disposed in a space between the main frames 14 and the down frame 16 and injects fuel toward a combustion chamber as will be described later. The fuel pump 31 is disposed in a space between the main frames 14 and the down frame 16 and supplies fuel to the fuel injection valve 29 to respond to a generated pump pressure as will be described later. A fuel pipe 32 is coupled with the fuel injection valve 29. The fuel pipe 32 extends from a delivery pipe 31a of the fuel pump 31 to thereby connect the fuel pump 31 with the fuel injection valve 29 and guides fuel from the fuel pump 31 to the fuel injection valve 29.

Figure 2:
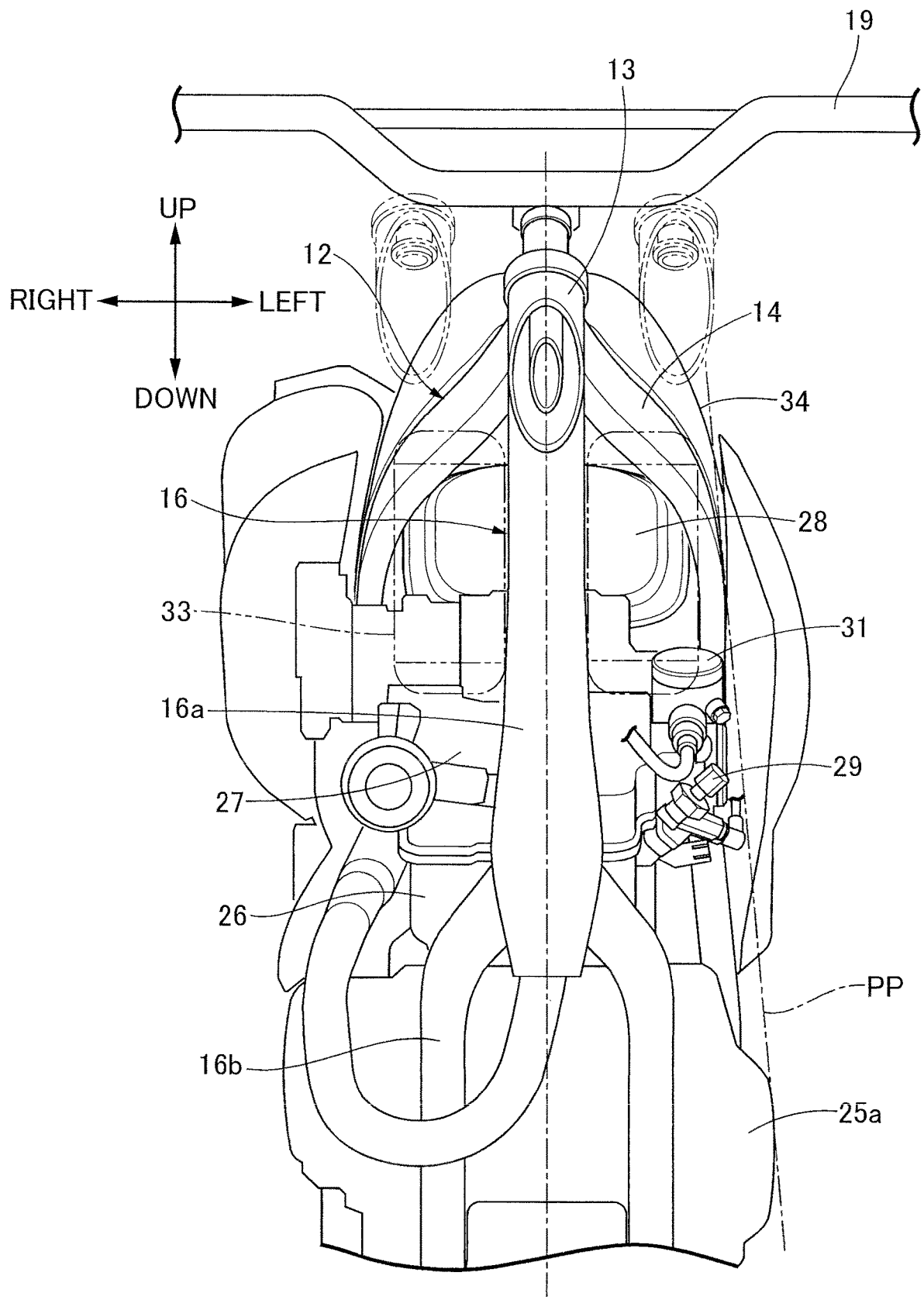
FIG. 2 is a sectional view taken along line 2-2 in FIG. 1.

A pair of left and right radiators 33 is mounted on the upper frame 16a of the down frame 16. The radiators 33 are connected with the internal combustion engine 24 and contributes to cooling of the internal combustion engine 24. The radiator 33 on the left-hand side is disposed in front of the vehicle body from the fuel injection valve 29. Coolant circulates between the left and right radiators 33 and the internal combustion engine 24. Coolant heated by the internal combustion engine 24 flows into, and cooled by, the radiators 33. The coolant cooled by the radiators 33 flows into a cooling jacket of the internal combustion engine 24. As depicted in FIG. 2, the fuel pump 31 is disposed inside an imaginary plane PP. The imaginary plane PP is in contact with an outer surface of the main frame 14 and an outer surface of the case cover 25a. The fuel pump 31 is avoided from protruding from the imaginary plane PP that contacts the main frame 14 and the case cover 25a from outside on the left side. The fuel pump 31 can be protected from a collision with another object.

Figure 3:
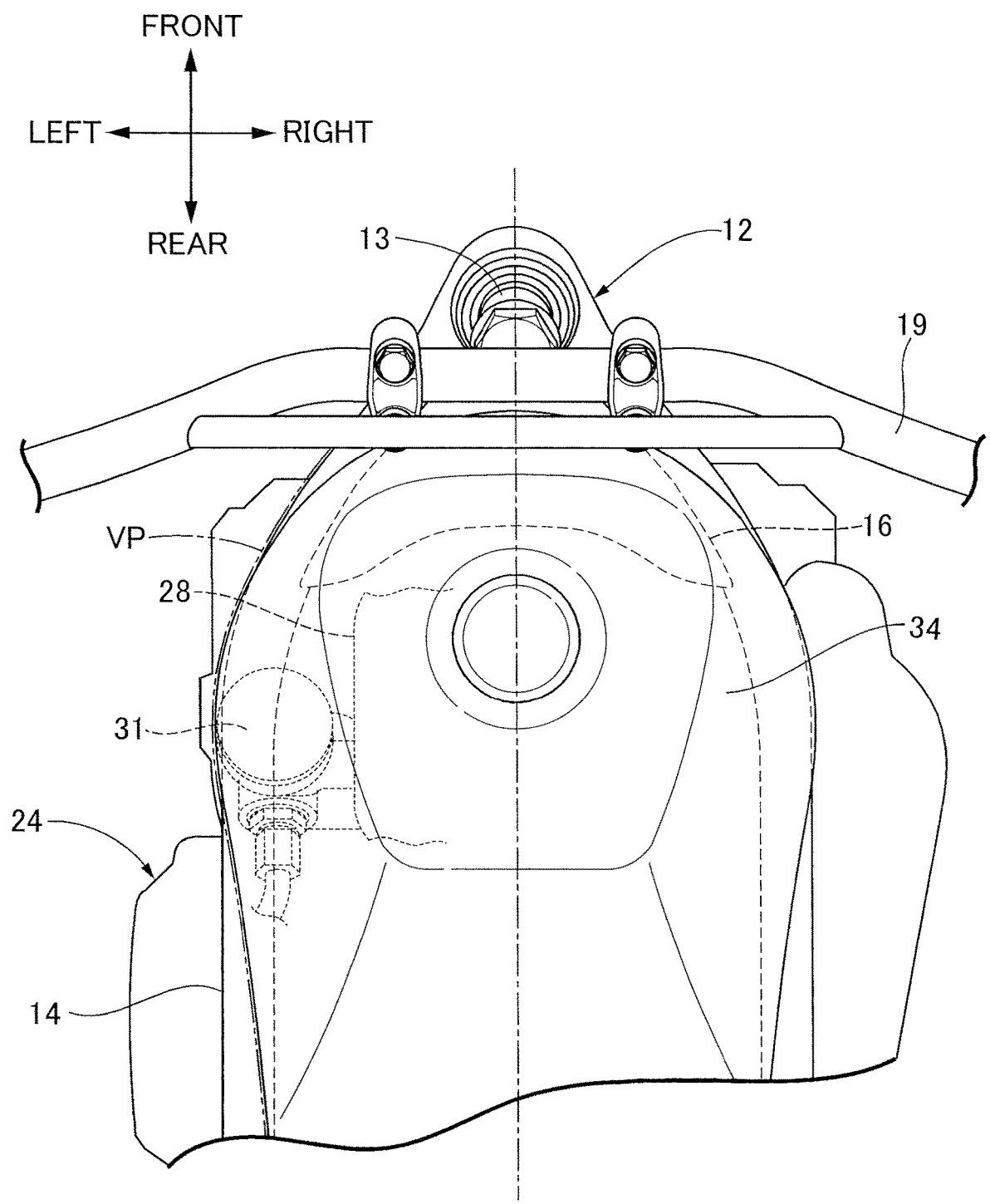
FIG. 3 is an enlarged plan view of parts around a fuel tank of the two-wheeled motor vehicle.

As depicted in FIG. 1, a fuel tank 34 is supported on the main frames 14 at a position above the internal combustion engine 24. A primary fuel pump 35 is disposed inside the fuel tank 34. The primary fuel pump 35 delivers fuel from the fuel tank 34. A primary fuel pipe 36 is connected with an intake pipe 31b of the fuel pump 31. The primary fuel pipe 36 extends from the primary fuel pump 35 to thereby connect the primary fuel pump 35 with the fuel pump 31 and supplies fuel from the primary fuel pump 35 to the fuel pump 31 on the basis of a pump pressure of the primary fuel pump 35. An occupant seat 37 is mounted on the vehicle body frame 12 at a position behind the fuel tank 34. When driving the two-wheeled motor vehicle 11, the occupant straddles the occupant seat 37. As depicted in FIG. 3, as seen in a plan view based on a viewpoint existing at a point at infinity in the upward direction, the fuel pump 31 is hidden by the fuel tank 34. To state the foregoing differently, the fuel pump 31 is disposed inside a curved vertical plane VP. The curved vertical plane VP extends in parallel with a gravitational direction and contacts a curved outer edge of the fuel tank 34. Thus, the fuel pump 31 is avoided from protruding from an outline of the fuel tank 34. The fuel pump 31 can be protected from a collision with another object.

Figure 4:
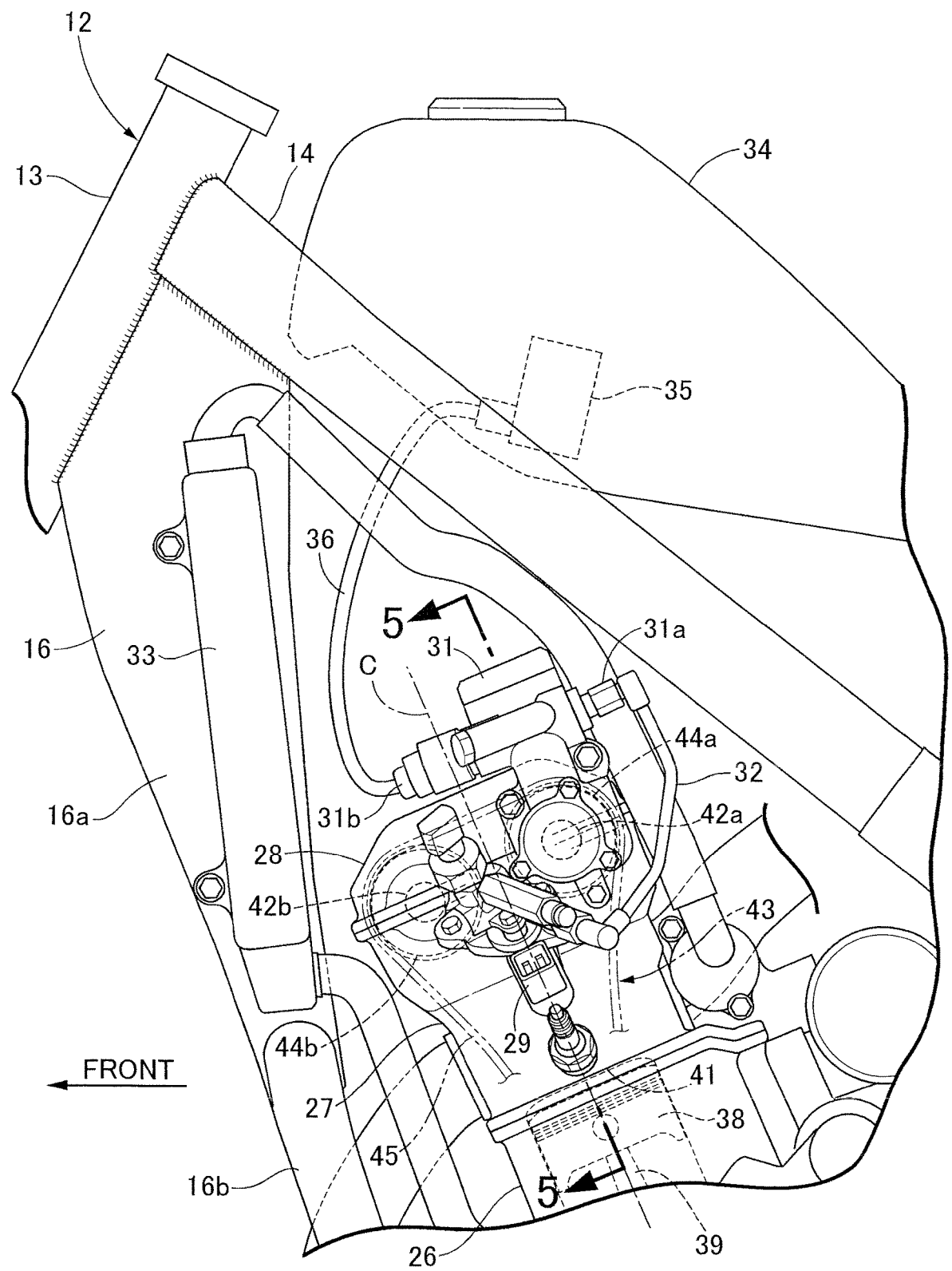
FIG. 4 is an enlarged side view of major components depicted in FIG. 1.

Reference is made to FIG. 4. The cylinder block 26 guides linear reciprocating motion of a piston 38 along the cylinder axis C. A connecting rod 39 is connected with the piston 38. The connecting rod 39 is connected with a crank of the crankshaft inside the crankcase 25. The connecting rod 39 translates the linear reciprocating motion of the piston 38 to rotary motion of the crankshaft.

The cylinder head 27 defines a combustion chamber 41 in a space between the cylinder head 27 and the piston 38. A pair of intake valves (not depicted) and a pair of exhaust valves (not depicted) are disposed in the combustion chamber 41. The intake valves open or close respective intake ports and the exhaust valves open or close respective exhaust ports. An intake camshaft 42a is connected with the intake valves. The intake camshaft 42a has an axis disposed, as seen in a side view, behind the cylinder axis C and extending in parallel with the rotational axis S of the crankshaft. To state the foregoing differently, the intake camshaft 42a is disposed further rearward in the vehicle body than an imaginary plane that extends in parallel with the rotational axis S of the crankshaft and includes the cylinder axis C. An exhaust camshaft 42b is connected with the exhaust valves. The exhaust camshaft 42b has an axis disposed, as seen in a side view, in front of the cylinder axis C and extending in parallel with the rotational axis S of the crankshaft. To state the foregoing differently, the exhaust camshaft 42b is disposed further forward in the vehicle body than the imaginary plane that extends in parallel with the rotational axis S of the crankshaft and includes the cylinder axis C. As will be described later, a valve actuating system 43 is connected with the intake camshaft 42a and the exhaust camshaft 42b. The valve actuating system 43 transmits power from the crankshaft to the intake camshaft 42a and the exhaust camshaft 42b. The valve actuating system 43 includes a cam chain 45. The cam chain 45 is wound around a sprocket 44a and a sprocket 44b. The sprocket 44a is fixed to the intake camshaft 42a. The sprocket 44b is fixed to the exhaust camshaft 42b.

The fuel injection valve 29 has a central axis (straight line including a central axis and extending infinitely) disposed in the cylinder axis C as seen in a vehicle side view and passes through the head pipe 13 as seen in the vehicle side view. To state the foregoing differently, the central axis of the fuel injection valve 29 is disposed in an imaginary plane extending in parallel with the rotational axis S of the crankshaft and including the cylinder axis C and an imaginary plane extending in parallel with the rotational axis S of the crankshaft and including the central axis of the fuel injection valve 29 traverses the head pipe 13. The fuel pump 31 is disposed, as seen in a side view, at a position offset rearward from the cylinder axis C. The fuel pipe 32 is disposed, as seen in a side view, at a position between the main frames 14 and the down frame 16. To state the foregoing differently, the fuel pump 31 is disposed further forward in the vehicle body than the imaginary plane extending in parallel with the rotational axis S of the crankshaft and including the cylinder axis C, and the fuel pipe 32 is disposed in a space sandwiched between an imaginary plane extending in parallel with the rotational axis S of the crankshaft and in contact with the main frames 14 from a front side of the vehicle body and an imaginary plane extending in parallel with the rotational axis S of the crankshaft and in contact with the down frame 16 from a rear side of the vehicle body. The fuel pipe 32 extends so as to surround a drive shaft of the fuel pump 31 (=intake camshaft 42a) around an axis and is connected with the fuel injection valve 29. The fuel pipe 32 is prevented from protruding toward the outside.

Figure 5:
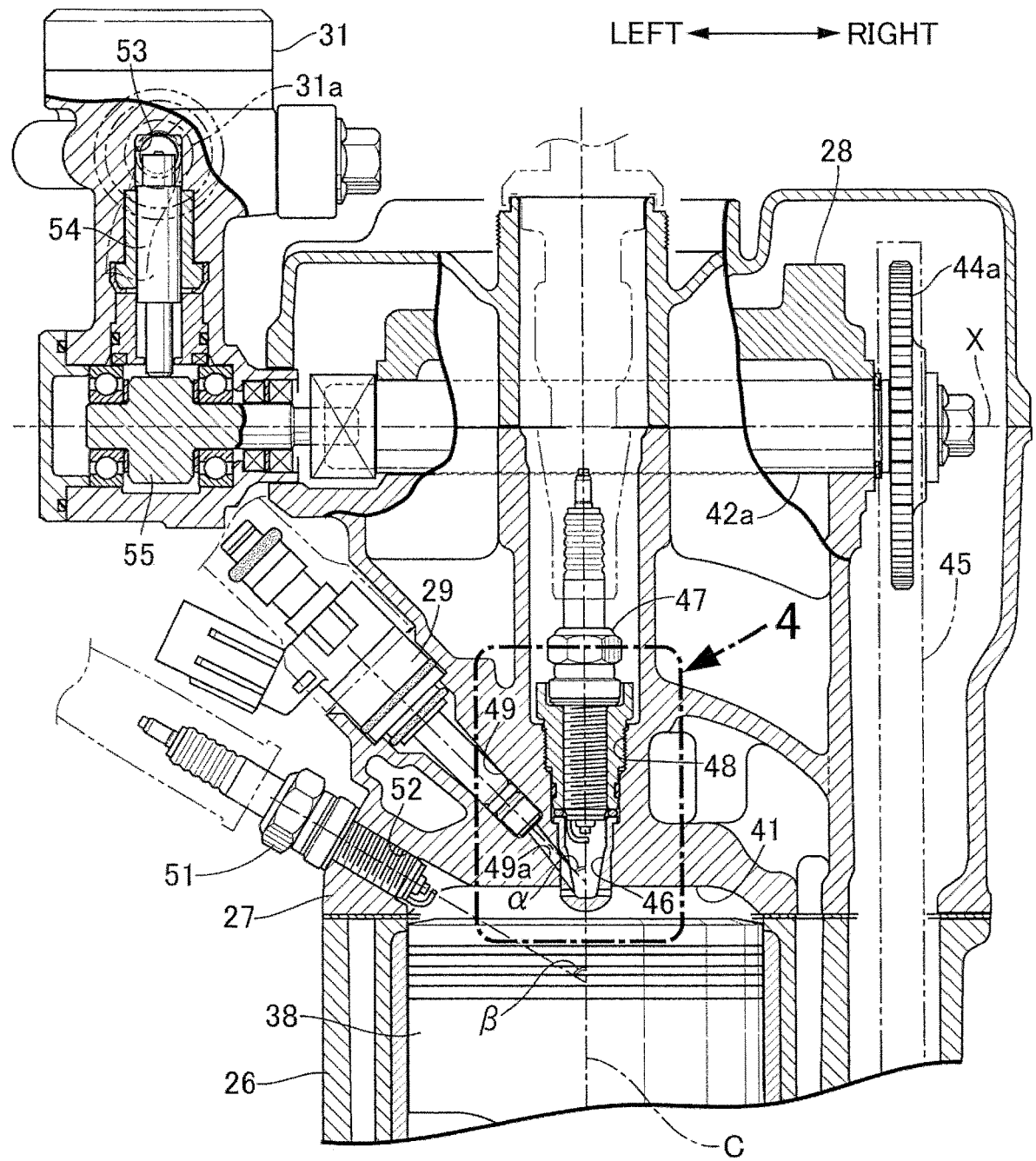
FIG. 5 is an enlarged sectional view taken along line 5-5 in FIG. 4.

Reference is made to FIG. 5. An auxiliary chamber 46 is provided in the cylinder head 27. The auxiliary chamber 46 communicates with the combustion chamber 41 at an apex of the combustion chamber 41. The fuel injection valve 29 has an injection port facing the auxiliary chamber 46. The cylinder head 27 has an insertion hole 48, a plug-in hole 49, and a threaded hole 52 formed therein. The insertion hole 48 receives a first ignition plug 47 and disposes a central axis of the first ignition plug 47 on the cylinder axis C. The plug-in hole 49 receives the fuel injection valve 29 and disposes a central axis of the fuel injection valve 29 on an axis inclined at a first inclination angle α with respect to the cylinder axis C. The threaded hole 52 receives a second ignition plug 51 and disposes a central axis of the second ignition plug 51 on an axis inclined at a second inclination angle β, which is greater than the first inclination angle α, with respect to the cylinder axis C. The first ignition plug 47 has an electrode facing a space inside the auxiliary chamber 46. The second ignition plug 51 has an electrode facing a space inside the combustion chamber 41. The fuel injection valve 29 is held in a position inclined with respect to the central axis of the first ignition plug 47 and has the injection port facing the auxiliary chamber 46 to thereby inject fuel inside the auxiliary chamber 46 toward the combustion chamber 41. It is noted that the fuel injection valve 29 is slanted with respect to a fuel passage 49a, which allows a gap to be provided between an upper end of the fuel injection valve 29 and the fuel pump 31.

The intake camshaft 42a has a rotational axis X. The rotational axis X extends from one side surface of the cylinder head 27 toward an other side surface of the cylinder head 27 in parallel with the rotational axis S of the crankshaft. The fuel pump 31 is disposed on an extension of the intake camshaft 42a on the one side surface of the cylinder head 27 to thereby be connected with the intake camshaft 42a. The sprocket 44a and the cam chain 45 of the valve actuating system 43 are disposed on the other side surface of the cylinder head 27. The fuel pump 31 includes open-close valves, a plunger 54, and a cam member 55. The open-close valves are disposed at the respective intake pipe 31b and delivery pipe 31a. The plunger 54 varies volume of a pressure chamber 53 communicating with the intake pipe 31b and the delivery pipe 31a. The cam member 55 is coupled coaxially with the intake camshaft 42a and produces reciprocating motion of the plunger 54. The fuel pump 31 is configured as a reciprocating fuel pump that receives a driving force from the intake camshaft 42a and delivers fuel under high pressure.

Figure 6:
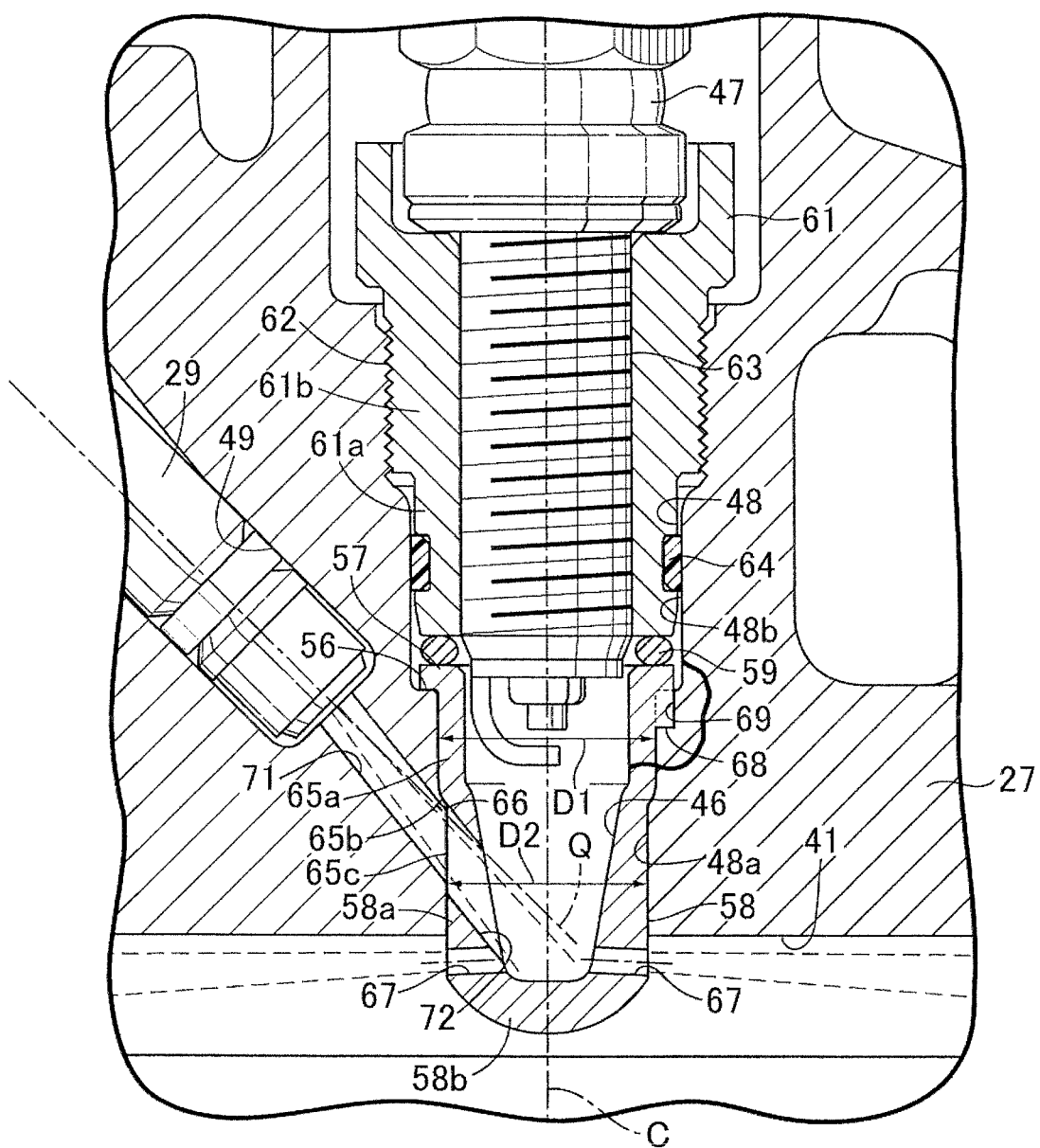
FIG. 6 is an enlarged sectional view of major components depicted in FIG. 5.

Reference is made to FIG. 6. The insertion hole 48 includes an auxiliary chamber hole portion (vertical hole) 48a and a plug hole portion 48b. The auxiliary chamber hole portion 48a is disposed on the combustion chamber 41 side and opened on a wall surface of the combustion chamber 41. The plug hole portion 48b has a diameter greater than a diameter of the auxiliary chamber hole portion 48a and is connected with the auxiliary chamber hole portion 48a by an annular shoulder 56. The auxiliary chamber 46 communicating with the combustion chamber 41 is defined in the auxiliary chamber hole portion 48a into which an auxiliary chamber bulkhead 58 is inserted. The auxiliary chamber bulkhead 58 has a flange 57 overlapping on the shoulder 56. The auxiliary chamber bulkhead 58 is formed of, for example, stainless steel. An annual first sealing member 59 overlaps on the flange 57. The first sealing member 59 is an axial metal seal.

An ignition plug holder 61 is inserted in the plug hole portion 48b. The ignition plug holder 61 has a tip end pressing the first sealing member 59 against the flange 57 to thereby hold the first ignition plug 47 in place and position a tip end of the first ignition plug 47 with respect to the auxiliary chamber 46. Because the insertion hole 48 and the plug-in hole 49 are individually formed in the cylinder head 27, the fuel injection valve 29 is mounted in the cylinder head 27 independently of the ignition plug holder 61.

The ignition plug holder 61 includes a cylindrical portion 61a and a threaded portion 61b. The cylindrical portion 61a is formed into a cylinder shape coaxial with the first ignition plug 47 and has a tip end clamping the first sealing member 59 between the tip end and the flange 57 of the auxiliary chamber bulkhead 58. The threaded portion 61b is connected with an upper end of the cylindrical portion 61a and formed into a cylinder shape coaxial with the first ignition plug 47 and has a threaded groove formed in an outer periphery thereof. The ignition plug holder 61 is formed of a copper-based material. The first sealing member 59 is clamped between the auxiliary chamber bulkhead 58 and the ignition plug holder 61 and isolates the space inside the auxiliary chamber 46 from outside air. The first ignition plug 47 is threaded into the ignition plug holder 61. The ignition plug holder 61 has a threaded groove 62 disposed at a position overlapping a threaded groove 63 of the first ignition plug 47 in an axial direction.

An annular second sealing member 64 is mounted on an outer periphery of the cylindrical portion 61a. The second sealing member 64 is clamped between the ignition plug holder 61 and an inner wall of the plug hole portion 48b. The second sealing member 64 is a resin seal in a radial direction. The second sealing member 64 isolates a space inside the insertion hole 48 on the combustion chamber 41 side from a space inside the insertion hole 48 on the outside air side.

The auxiliary chamber bulkhead 58 includes a peripheral wall portion 58a and a bottom wall portion 58b. The peripheral wall portion 58a is inserted in the auxiliary chamber hole portion 48a, which extends from the combustion chamber 41 along the cylinder axis (reference axis) C, to thereby be in contact with an inner wall of the auxiliary chamber hole portion 48a around the cylinder axis C. The bottom wall portion 58b is continuous from the peripheral wall portion 58a and bulges from the auxiliary chamber hole portion 48a toward the combustion chamber 41. The peripheral wall portion 58a and the bottom wall portion 58b define the auxiliary chamber 46 communicating with the combustion chamber 41. The first ignition plug 47 is disposed above the peripheral wall portion 58a. The bottom wall portion 58b bulges in a dome shape toward the combustion chamber 41. Thus, the bottom wall portion 58b has an increasing wall thickness in going closer to a center (cylinder axis C).

The peripheral wall portion 58a of the auxiliary chamber bulkhead 58 includes a first tubular portion 65a, a constricted portion 65b, and a second tubular portion 65c. The first tubular portion 65a has an upper end supporting the flange 57 and has a first outside diameter D1. The constricted portion 65b is continuous from a lower end of the first tubular portion 65a and diminishes in size in the radial direction in going closer to the combustion chamber 41. The second tubular portion 65c is continuous from a lower end of the constricted portion 65b and has a second outside diameter D2 smaller than the first outside diameter D1. The auxiliary chamber hole portion 48a includes a constricted portion 66. The constricted portion 66 diminishes in size in the radial direction in going closer to the combustion chamber 41 to correspond to the constricted portion 65b of the auxiliary chamber bulkhead 58. The constricted portion 65b of the auxiliary chamber bulkhead 58 and the constricted portion 66 of the auxiliary chamber hole portion 48a contact each other to form a labyrinth structure. The first tubular portion 65a, the constricted portion 65b, and the second tubular portion 65c uniformly contact the inner wall of the auxiliary chamber hole portion 48a.

The peripheral wall portion 58a has a wall having a thickness increasing at the second tubular portion 65c toward the bottom wall portion 58b. In the embodiment, the second tubular portion 65c forms a taper-shaped space becoming narrower toward the bottom wall portion 58b. The peripheral wall portion 58a has a communication hole 67 formed therein at a lower end thereof. The communication hole 67 passes through the peripheral wall portion 58a in a wall thickness direction and connects the auxiliary chamber 46 with the combustion chamber 41. The communication hole 67 extends radially from the cylinder axis C. A positioning protrusion 68 is formed on an outer periphery of the auxiliary chamber bulkhead 58. The positioning protrusion 68 is continuous from the flange 57 and protrudes radially toward the outside at a specific position in a peripheral direction. The cylinder head 27 has has a notch or recess 69 formed therein which communicates with, and is continuous with the auxiliary chamber hole portion 48a. The notch or recess 69 is recessed from the shoulder 56 at the specific position in the peripheral direction to thereby receive therein the positioning protrusion 68. An angular position of the auxiliary chamber bulkhead 58 about the cylinder axis C can be fixed by the positioning protrusion 68 being fitted in the notch or recess 69.

The cylinder head 27 has a fuel injection passage 71 formed therein. The fuel injection passage 71 having a diameter smaller than a diameter of the fuel injection valve 29 extends from a front end of the plug-in hole 49. The fuel injection passage 71 has an axis crossing the cylinder axis C at an inclination angle smaller than the first inclination angle α of an axis Q of the fuel injection valve 29. The fuel injection valve 29, being inclined with respect to the fuel injection passage 71 as described above, allows a gap to be provided between an upper end of the fuel injection valve 29 and the fuel pump 31 as depicted in FIG. 5. The peripheral wall portion 58a has a passage 72 as an extension from the fuel injection passage 71. The passage 72 is opened on an inner surface of the peripheral wall portion 58a further on the combustion chamber 41 side than the constricted portion 65b. The fuel injection passage 71 extends from the injection port of the fuel injection valve 29 to an opening in the passage 72. The fuel injection valve 29 injects fuel toward the bottom wall portion 58b inside the auxiliary chamber 46. A fuel injection range is formed so as to deviate from the communication hole 67.

An operation of the present embodiment will be described below. In the present embodiment, the fuel injection valve 29 is mounted in the cylinder head 27 from the one side surface of the cylinder head 27. The fuel pump 31 is disposed in the space between the main frames 14 and the down frame 16 and mounted on the one side surface of the cylinder head 27. Because the fuel pump 31 is mounted on the one side surface of the cylinder head 27 together with the fuel injection valve 29, interference between the fuel pump 31 and the main frames 14 is avoided without relatively restricting posture of the internal combustion engine 24. The fuel pump 31 is disposed between the main frames 14 and the down frame 16 without relatively restricting the posture of the internal combustion engine 24. Sufficient protection of the fuel pump 31 can be achieved without restricting the posture of the internal combustion engine 24. Additionally, because the fuel pump 31 is disposed to be close to the fuel injection valve 29, the fuel pipe 32 through which fuel is supplied from the fuel pump 31 to the fuel injection valve 29 can be made as short as possible.

The central axis of the fuel injection valve 29 passes through the head pipe 13 as seen in a side view that is projected in parallel with the rotational axis S of the crankshaft onto a projection plane orthogonal to the rotational axis S of the crankshaft. The main frames 14 and the down frame 16 are closer to each other in going closer to the head pipe 13. Thus, when the central axis of the fuel injection valve 29 passes through the head pipe 13 as seen in the side view, a space is allocated on the central axis of the fuel injection valve 29 between the main frames 14 and the down frame 16. The foregoing improves maintainability of the internal combustion engine 24 including the fuel injection valve 29.

As seen in the side view that is projected in parallel with the rotational axis S of the crankshaft onto the projection plane orthogonal to the rotational axis S of the crankshaft, the central axis of the fuel injection valve 29 is disposed on the cylinder axis C, the fuel pump 31 is disposed at a position offset from the cylinder axis C as seen in the side view, and the fuel pipe 32 is disposed between the main frames 14 and the down frame 16 as seen in the side view. As described previously, a space is made available sufficiently on the central axis of the fuel injection valve 29 between the main frames 14 and the down frame 16. Thus, a sufficient space is formed between the main frames 14 and the down frame 16, and the fuel pump 31. Thus, maintainability of the fuel pump 31 is favorably achieved. The fuel pipe 32 is favorably protected between the main frames 14 and the down frame 16.

The fuel pump 31 is connected with the fuel tank 34, which is supported on the main frames 14, via the primary fuel pipe 36 and is disposed, as seen in the side view that is projected in parallel with the rotational axis S of the crankshaft onto the projection plane orthogonal to the rotational axis S of the crankshaft, at a position offset rearward from the cylinder axis C. Because the fuel pump 31 is disposed at a position offset rearward from the cylinder axis C as seen in the side view, the primary fuel pipe 36, which connects the fuel pump 31 with the primary fuel pump 35 inside the fuel tank 34 can be made as short as possible.

The two-wheeled motor vehicle 11 includes the radiators 33. The radiators 33 are mounted on the down frame 16 further forward in the vehicle body than the fuel injection valve 29. The radiators 33 are spaced away from the fuel pump 31 at a position in front of the fuel pump 31. The fuel pump 31 is thus made free as much as possible from hot air of the radiators 33. The fuel pump 31 can thus be prevented from becoming hot.

The fuel pump 31 is a reciprocating fuel pump that is disposed on an extension from the intake camshaft 42a, which is supported by the cylinder head 27, and receives a driving force from the intake camshaft 42a. The reciprocating fuel pump 31 achieves supply of fuel under high pressure corresponding to the driving force of the intake camshaft 42a, which rotates at high speed. Thus, fuel injection into the combustion chamber (what is called, direct injection) can be achieved.

The auxiliary chamber 46 is provided in the cylinder head 27. The auxiliary chamber 46 communicates with the combustion chamber 41 at the apex of the combustion chamber 41. The auxiliary chamber 46 faces the injection port of the fuel injection valve 29. Because the combustion chamber 41 is closest to the camshafts 42a and 42b at the apex position, the fuel injection valve 29 is disposed to be as close as possible to the intake camshaft 42a. Thus, the distance between the fuel injection valve 29 and the fuel pump 31 is shortened as much as possible. The fuel pipe 32, which connects the fuel pump 31 with the fuel injection valve 29, is shortened as much as possible and the space for protecting the fuel injection valve 29 and the fuel pump 31 is reduced as much as possible.

The internal combustion engine 24 of the two-wheeled motor vehicle 11 includes the first ignition plug 47 and the second ignition plug 51. The first ignition plug 47 has a central axis disposed on the cylinder axis C and faces a space inside the auxiliary chamber 46. The second ignition plug 51 has a central axis that crosses the cylinder axis C at the second inclination angle β and the second ignition plug 51 faces a space inside the combustion chamber 41. In achieving the fuel injection into the combustion chamber, the first ignition plug 47 and the second ignition plug 51 can be inserted in the cylinder head 27 such that neither the first ignition plug 47 nor the second ignition plug 51 interferes with the fuel injection valve 29 or the fuel pump 31.

In the internal combustion engine 24 in the present embodiment, the camshafts 42a and 42b extend from the one side surface toward the other side surface of the cylinder head 27 and the valve actuating system 43, which transmits power from the crankshaft to the camshafts 42a and 42b, is disposed on the other side surface of the cylinder head 27. The fuel pump 31 is disposed on the one ends side of the camshafts 42a and 42b and the valve actuating system 43 is disposed on the other ends side of the camshafts 42a and 42b. This configuration achieves favorable weight balance of the internal combustion engine 24. In addition, favorable maintainability of the valve actuating system 43 can be achieved without disturbance by the fuel injection valve 29 or the fuel pump 31.

In the present embodiment, the first sealing member 59 overlaps on the flange 57 of the auxiliary chamber bulkhead 58 and the ignition plug holder 61 is inserted in the plug hole portion 48b of the insertion hole 48 and has the tip end pressing the first sealing member 59 against the flange 57, and the second sealing member 64 is clamped between the ignition plug holder 61 and the inner wall of the plug hole portion 48b. Pressure leakage of the auxiliary chamber 46 is reliably prevented, because the first sealing member 59 is axially clamped between the ignition plug holder 61 and the flange 57 of the auxiliary chamber bulkhead 58 through the functioning of an axial pressing force acting from the ignition plug holder 61. Moreover, the flange 57 pressed against the shoulder 56 functions as a sealing member. Thus, even when the peripheral wall portion 58a of the auxiliary chamber bulkhead 58 in contact with the inner wall of the auxiliary chamber hole portion 48a is thin, the axial pressing force does not cause the peripheral wall portion 58a to be deformed, so that escapes of pressure leaking from the combustion chamber 41 along the inner wall of the auxiliary chamber hole portion 48a can be reliably prevented from occurring. Additionally, the second sealing member 64, because being disposed outside in the axial direction with respect to the flange 57 of the auxiliary chamber bulkhead 58 and the first sealing member 59, exhibits a sealing function commonly for gas leakage of the combustion chamber 41 and gas leakage of the auxiliary chamber 46. Thus, the sealing structure of the internal combustion engine 24 is simplified.

The first sealing member 59, which is clamped between the auxiliary chamber bulkhead 58 and the ignition plug holder 61 throughout an entire periphery about the cylinder axis C, is an axial metal seal and the second sealing member 64, which is clamped between the cylindrical portion 61a of the ignition plug holder 61 and the inner wall of the insertion hole 48, is a radial resin seal. The first sealing member 59 as a metal seal reliably prevents pressure leakage even with a configuration of being clamped between the flange 57 of the auxiliary chamber bulkhead 58 and the ignition plug holder 61 to thereby be subjected to axial load. The second sealing member 64 as a resin seal facilitates removal and installation for greater maintainability.

In the internal combustion engine 24 in the present embodiment, the auxiliary chamber hole portion 48a of the insertion hole 48 and the auxiliary chamber bulkhead 58 include the constricted portion 66 and the constricted portion 65b, respectively. The constricted portions 66 and 65b contact each other and diminish in size in the radial direction in going closer to the combustion chamber 41. The labyrinth structure formed between the inner wall of the auxiliary chamber hole portion 48a and the outer surface of the auxiliary chamber bulkhead 58 prevents escapes of pressure leaking from the combustion chamber 41 along the inner wall of the auxiliary chamber hole portion 48a. The foregoing reduces load on the second sealing member 64 and simplifies the sealing structure.

The ignition plug holder 61 in the present embodiment includes the cylindrical portion 61a, which is formed into a cylinder shape coaxial with the first ignition plug 47 and which has a tip end clamping the first sealing member 59 between the tip end and the flange 57 of the auxiliary chamber bulkhead 58, and the threaded portion 61b, which is connected with the upper end of the cylindrical portion 61a and formed into a cylinder shape coaxial with the first ignition plug 47 and has the threaded groove 62 formed in the outer periphery of the threaded portion 61b. The second sealing member 64 is mounted on an outer periphery of the cylindrical portion 61a. Because the ignition plug holder 61 is formed into a cylinder shape coaxial with the first ignition plug 47, a difference in outline between the auxiliary chamber 46 and the ignition plug holder 61 can be reduced. This feature eliminates the need for a wide gap between the intake valve and the exhaust valve, so that the auxiliary chamber can be readily applied to a cylinder having a small-diameter bore.

In the internal combustion engine 24 in the present embodiment, the threaded groove 62 of the ignition plug holder 61 is disposed at a position overlapping the threaded groove 63 of the first ignition plug 47 in the axial direction. The first ignition plug 47 is coupled with the ignition plug holder 61 through the threaded groove 63 and favorable heat transfer is achieved from the first ignition plug 47 to the ignition plug holder 61 over a range of the threaded groove 63. Similarly, the ignition plug holder 61 is coupled with the cylinder head 27 through the threaded groove 62 and favorable heat transfer is achieved from the ignition plug holder 61 to the cylinder head 27 over a range of the threaded groove 62. Heat transfer is thereby promoted from the first ignition plug 47 to the cylinder head 27.

As described previously, the fuel injection valve 29 is mounted in the cylinder head 27 independently of the ignition plug holder 61 and is disposed in a position inclined with respect to the central axis of the first ignition plug 47 so as to face the opening in the passage 72 formed in the auxiliary chamber bulkhead 58. Whereas the ignition plug holder 61 is disposed above the axial direction of the auxiliary chamber bulkhead 58, the fuel injection valve 29 is disposed in an area around the auxiliary chamber bulkhead 58. Thus, compared with a configuration in which the ignition plug holder 61 and the fuel injection valve 29 are disposed in juxtaposition with each other, the auxiliary chamber 46 can have a reduced width (diameter). This feature eliminates the need for a wide gap between the intake valve and the exhaust valve disposed around the first ignition plug 47 and the fuel injection valve 29, so that the auxiliary chamber can be readily applied to a cylinder having a small-diameter bore.

The ignition plug holder 61 is formed of a copper-based material. Because the ignition plug holder 61 is formed of a copper-based material, favorable heat transfer can be achieved and the first ignition plug 47 can be favorably prevented from being electrically charged to correspond to favorable conductivity of the copper-based material.

In the internal combustion engine 24 in the present embodiment, the first ignition plug 47 is disposed above the peripheral wall portion 58a of the auxiliary chamber bulkhead 58 along the reference axis (cylinder axis C) and the fuel injection valve 29 is disposed in a position inclined with respect to the reference axis so as to face the opening in the passage 72 formed in the inner surface of the peripheral wall portion 58a. Whereas the first ignition plug 47 is disposed above the peripheral wall portion 58a of the auxiliary chamber bulkhead 58, the fuel injection valve 29 is disposed in an area around the peripheral wall portion 58a. Thus, compared with a configuration in which the first ignition plug 47 and the fuel injection valve 29 are disposed in juxtaposition with each other, the auxiliary chamber 46 can have a reduced width (diameter). This feature eliminates the need for a wide gap between the intake valve and the exhaust valve disposed around the first ignition plug 47 and the fuel injection valve 29, so that the auxiliary chamber 46 can be readily applied to a cylinder having a small-diameter bore.

The internal combustion engine 24 has the fuel injection passage 71. The fuel injection passage 71 extends from the injection port of the fuel injection valve 29 to the opening in the passage 72 and has a diameter smaller than the diameter of the fuel injection valve 29. Because the fuel injection passage 71 is formed to have a narrow diameter, the fuel injection valve 29 is protected from combustion pressure in the auxiliary chamber 46. Durability of the fuel injection valve 29 is thus improved.

The bottom wall portion 58b of the auxiliary chamber bulkhead 58 bulges in a dome shape toward the combustion chamber 41. The bottom wall portion 58b has an increasing wall thickness toward the center. Thus, a sufficient wall thickness is given to the bottom wall portion 58b. The bottom wall portion 58b, after having been cooled by fuel injected from the fuel injection valve 29, is subjected to high temperatures to correspond to combustion inside the combustion chamber 41. Because of the sufficient wall thickness given to the bottom wall portion 58b, thermal energy tends to stagnate at the bottom wall portion 58b, compared with a configuration in which the bottom wall portion 58b is formed into a thin-sheet shape. As a result, the bottom wall portion 58b can be maintained at an optimum temperature regardless of the fuel cooling or combustion. Deposits, for example, are prevented from increasing to correspond to the maintained temperature and durability of the auxiliary chamber bulkhead 58 is improved.

The peripheral wall portion 58a of the auxiliary chamber bulkhead 58 has a wall having a thickness increasing toward the bottom wall portion 58b. The peripheral wall portion 58a is connected with the bottom wall portion 58b via a region having a maximum wall thickness. This promotes heat transfer from the bottom wall portion 58b toward the peripheral wall portion 58a. Consequently, heat of the bottom wall portion 58b is efficiently diffused from the inner wall surface of the auxiliary chamber hole portion 48a toward the cylinder head 27, which defines the auxiliary chamber hole portion 48a.

The peripheral wall portion 58a of the auxiliary chamber bulkhead 58 has the communication hole 67 formed therein at the lower end thereof, at which the peripheral wall portion 58a is connected with the bottom wall portion 58b. The communication hole 67 passes through the peripheral wall portion 58a in a wall thickness direction and connects the auxiliary chamber 46 with the combustion chamber 41. Because the communication hole 67 passes through the peripheral wall portion 58a at the lower end of the peripheral wall portion 58a in the thickness direction, the communication hole 67 is allowed to have a sufficient length by utilizing the increase in the wall thickness. As a result, combustion gas can be injected in an optimum injection direction from the space inside the auxiliary chamber 46 toward the combustion chamber 41.

What is claimed is:

1. An internal combustion engine comprising an auxiliary chamber bulkhead, the auxiliary chamber bulkhead including a peripheral wall portion that is inserted in a vertical hole extending from a combustion chamber along a reference axis and that is in contact with an inner wall of the vertical hole about the reference axis, and a bottom wall portion that is continuous from the peripheral wall portion and that bulges from the vertical hole toward the combustion chamber, the peripheral wall portion and the bottom wall portion defining an auxiliary chamber that communicates with the combustion chamber, wherein the engine further comprises:
an ignition plug disposed above the peripheral wall portion along the reference axis; and
a fuel injection valve disposed in a position inclined with respect to the reference axis toward an opening formed in an inner surface of the peripheral wall portion,
wherein a positioning protrusion is formed on an outer periphery of the peripheral wall portion and fitted in a recess that is formed so as to be recessed only at a specific limited position in a peripheral direction of the vertical hole, and wherein the positioning protrusion and recess are configured to fix an angular position of the auxiliary chamber bulkhead in relation to the reference axis when the auxiliary chamber bulkhead is installed in the vertical hole.

2. The internal combustion engine according to claim 1, further comprising:
a fuel injection passage that extends from an injection port of the fuel injection valve to the opening and that has a diameter smaller than a diameter of the fuel injection valve.

3. The internal combustion engine according to claim 2, wherein the bottom wall portion bulges in a dome shape toward the combustion chamber.

4. The internal combustion engine according to claim 3, wherein the peripheral wall portion has a wall having a thickness increasing toward the bottom wall portion.

5. The internal combustion engine according to claim 4, wherein the peripheral wall portion has a communication hole formed therein at a lower end thereof, at which the peripheral wall portion is connected with the bottom wall portion, the communication hole passing through the peripheral wall portion in a wall thickness direction and connecting the auxiliary chamber with the combustion chamber.

6. The internal combustion engine according to claim 1, further comprising:
a cylinder head defining therein an insertion hole, the insertion hole including the vertical hole and a plug hole having a diameter greater than a diameter of the vertical hole and connected with the vertical hole via a shoulder, the insertion hole opening to a wall surface of the combustion chamber;
a flange formed in the auxiliary chamber bulkhead and inserted into the plug hole to thereby overlap on the shoulder;
a first sealing member overlapping on the flange; and
an ignition plug holder inserted into the plug hole to have a tip end pressing the first sealing member against the flange, to thereby hold the ignition plug in place and position a tip end of the ignition plug with respect to the auxiliary chamber.

7. The internal combustion engine according to claim 6, further comprising:
a second sealing member clamped between the ignition plug holder and an inner wall of the plug hole.

8. The internal combustion engine according to claim 7, wherein the first sealing member is an axial metal seal and the second sealing member is a radial resin seal.

9. The internal combustion engine according to claim 8, wherein the vertical hole and the auxiliary chamber bulkhead include respective constricted portions that contact each other and diminish in size in a radial direction in going closer to the combustion chamber.

10. The internal combustion engine according to claim 9, wherein
the ignition plug holder includes:
a cylindrical portion that is formed into a cylinder shape coaxial with the ignition plug and that has a tip end clamping the first sealing member between the tip end and the flange of the auxiliary chamber bulkhead; and
a threaded portion that is connected with an upper end of the cylindrical portion and formed into a cylinder shape coaxial with the ignition plug and that has a threaded groove formed in an outer periphery of the threaded portion, and
the second sealing member is disposed on an outer periphery of the cylindrical portion.

11. The internal combustion engine according to claim 10, wherein the threaded groove of the ignition plug holder is disposed at a position overlapping a threaded groove of the ignition plug in an axial direction.

12. The internal combustion engine according to claim 11, wherein the fuel injection valve is mounted in the cylinder head independently of the ignition plug holder.

13. The internal combustion engine according to claim 12, wherein the ignition plug holder is formed of a copper-based material.

14. The internal combustion engine according to claim 1, wherein the fuel injection valve is configured to inject fuel toward the bottom wall portion inside the auxiliary chamber and a communication hole is formed around the bottom wall portion to connect the auxiliary chamber to the combustion chamber.

15. The internal combustion engine according to claim 14, further comprising:
a fuel injection passage that extends from an injection port of the fuel injection valve to the opening and that has a diameter smaller than a diameter of the fuel injection valve.

16. The internal combustion engine according to claim 15, wherein the bottom wall portion bulges in a dome shape toward the combustion chamber.

17. The internal combustion engine according to claim 16, wherein the peripheral wall portion has a wall having a thickness increasing toward the bottom wall portion.

18. The internal combustion engine according to claim 17, wherein the communication hole passes through the peripheral wall portion in a wall thickness direction at a lower end of the peripheral wall portion that is connected to the bottom wall portion.

* * * * *